United States Patent

[11] 3,565,142

[72] Inventor Dexter H. Mac Queston
Winchendon, Mass.
[21] Appl. No. 820,253
[22] Filed Apr. 29, 1969
[45] Patented Feb. 23, 1971
[73] Assignee Goodspeed Machine Company
Winchendon, Mass.
a corporation of Massachusetts

[54] AUTOMATIC DRILLING MACHINE
10 Claims, 6 Drawing Figs.
[52] U.S. Cl. .................................................. 144/112;
144/4; 144/35; 77/24; 77/5
[51] Int. Cl. ..................................................... B23b 39/16,
B23c 3/04
[50] Field of Search .......................................... 144/4, 35,
93, 110, 112; 77/22, 24, 5.1

[56] References Cited
UNITED STATES PATENTS
332,699 12/1885 Bush ............................ 144/4
3,452,792 1/1969 Foreman ..................... 144/93

Primary Examiner—Francis S. Husar
Attorney—Charles R. Fay

ABSTRACT: An automatic drilling machine including a hopper for spindles or the like to be fed one by one into the working area; a plurality of automatic drill heads; and clamping means for the spindles to position them with reference to the drills, each drill being adjustable both as to its position of action with respect to the spindle, its angle, and the length or depth of hole to be drilled. The machine also includes cutoff saws, chucking means, and a new and improved feed device for the spindles, and control means for the operation of all the tools, said control means being dependent on the position of the spindle feed device.

INVENTOR.
Dexter H. MacQueston

INVENTOR.
Dexter H. MacQueston
BY
Charles R. Fay, atty.

3,565,142

1

AUTOMATIC DRILLING MACHINE

BACKGROUND OF THE INVENTION

It is a time-consuming operation to drill all the holes at the angles required in spindles, etc., for various uses, as in furniture. The spindles must be handled from drill spindle to drill spindle increasingly the operative costs, and it is the object of the present invention automatically and simultaneously to make one, two or three or more holes as required in the spindles while chucking at both ends, the complete operation being much faster than possible with prior art machinery and procedures.

SUMMARY OF THE INVENTION

This machine provides a fully automatic operation for drilling one, two, three or more holes in a spindle, e.g. for chairs, legs, etc. The machine comprises a hopper receiving spindles one after another descending by gravity to a reciprocable feeder underneath the hopper receiving at each reciprocation only the lowermost spindle in the hopper when the feeder is retracted and moving the same forwardly to a working area, in some cases past either single or double cutoff saws to an automatic clamping means at the working area. There is also an air device for moving the spindle axially to correctly locate the same.

A plurality of automatically actuated drill heads which depend for their operation upon the position of the feeder each include adjustable means for locating the drill at the precise spot desired, and they also have means for reciprocating them to and from the work. The drill heads are all independently mounted and are all independently adjustable including the depth of cut desired. The drill heads are adjustable longitudinally of the spindle when it is in the work area, and each adjustment of each of the parts involved is provided with scales to enable positioning each part exactly where desired for a required piece of work.

The machine also includes chucking devices which approach each other to operate on the ends of the spindle if this should be desired while it is being drilled.

When the piece has been completed, the forward end of the reciprocating feeder in bringing the new spindle to be clamped removes the finished spindle from its holder so that it descends by gravity through a slot in the machine base to a collecting position at the front of the machine.

PREFERRED EMBODIMENT OF THE INVENTION

Figure 1:
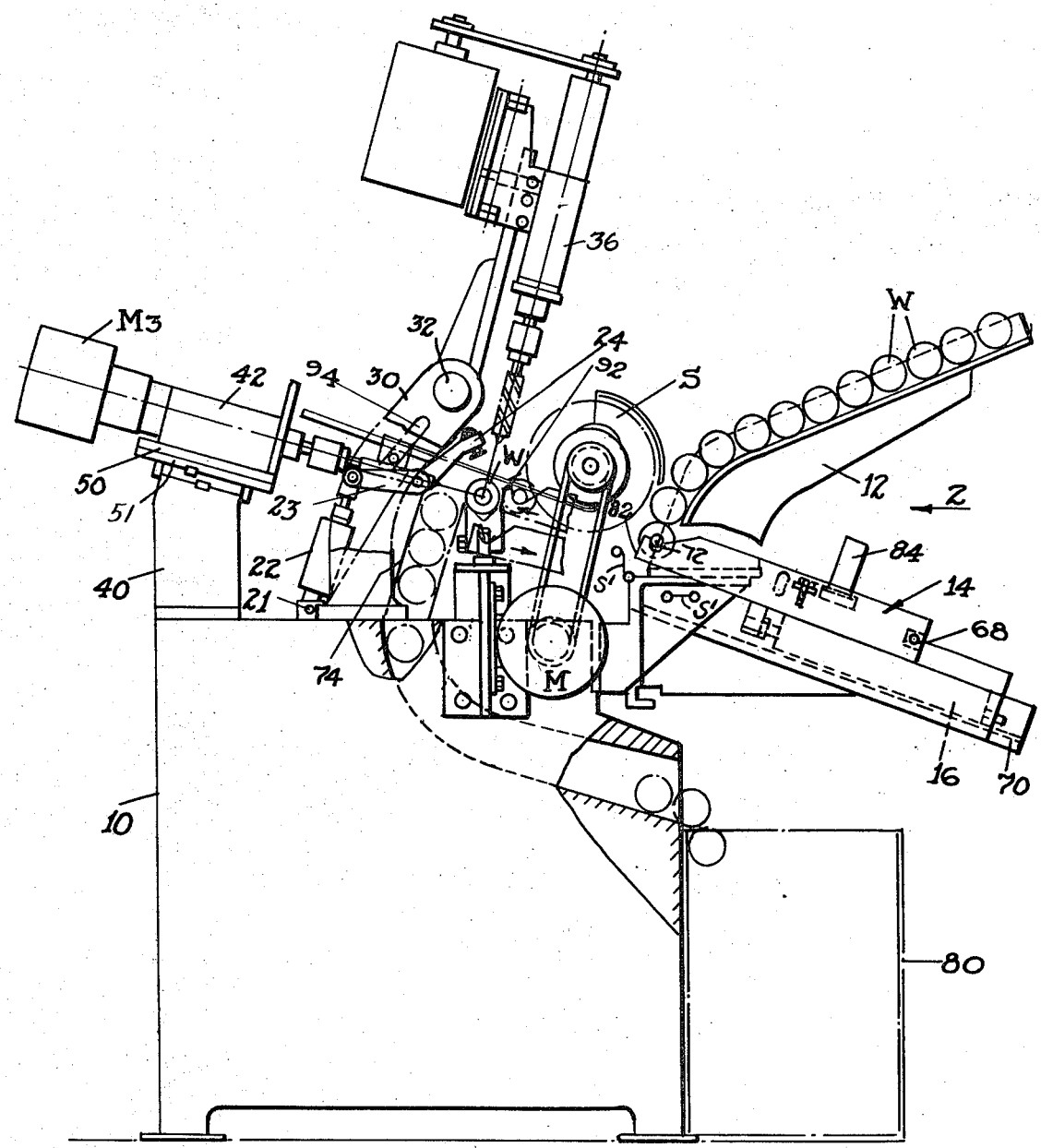
FIG. 1 is a view in side elevation illustrating the machine, parts being cut away for clarity of illustration.

Referring first to FIG. 1, there is shown a machine frame 10. All of the parts of the machine are conveniently mounted on this machine frame including a gravity hopper 12 in which the workpieces W are positioned to descend seriatim by gravity where they are received by a reciprocating work feeder device generally indicated at 14. This feeder reciprocates under influence of pneumatic cylinder or the like 16 to position the lowermost workpiece W onto the work holders at 18. These work holders have V-shaped brackets for the purpose and are vertically adjustable on standards 20 (see FIG. 4) and they are likewise longitudinally adjustable parallel to the axis of the workpiece W as may be found desired or convenient.

2

Figure 2:
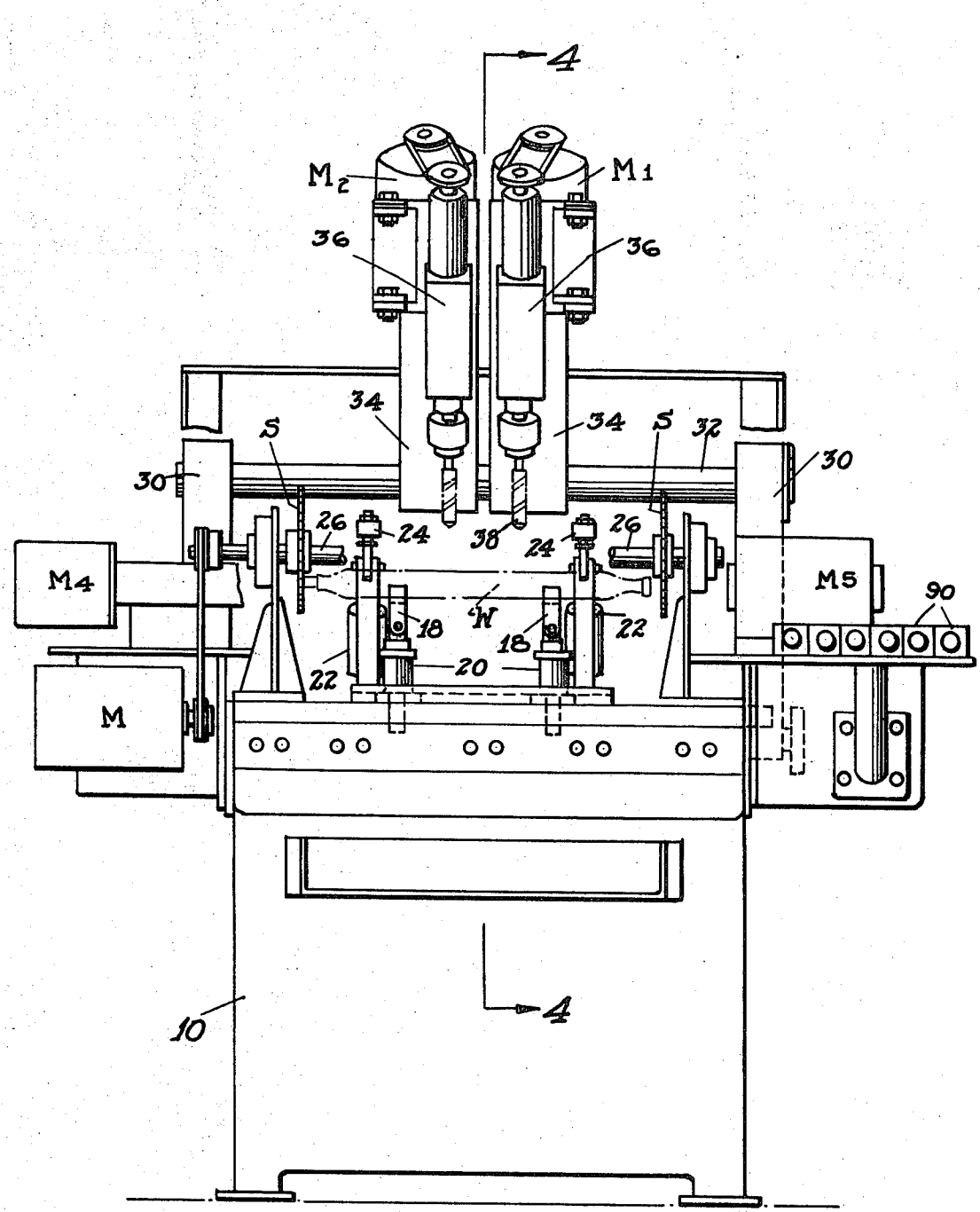
FIG. 2 is a view in front elevation with the hopper removed and looking in general in the direction of arrow 2 in FIG. 1.
Figure 3:
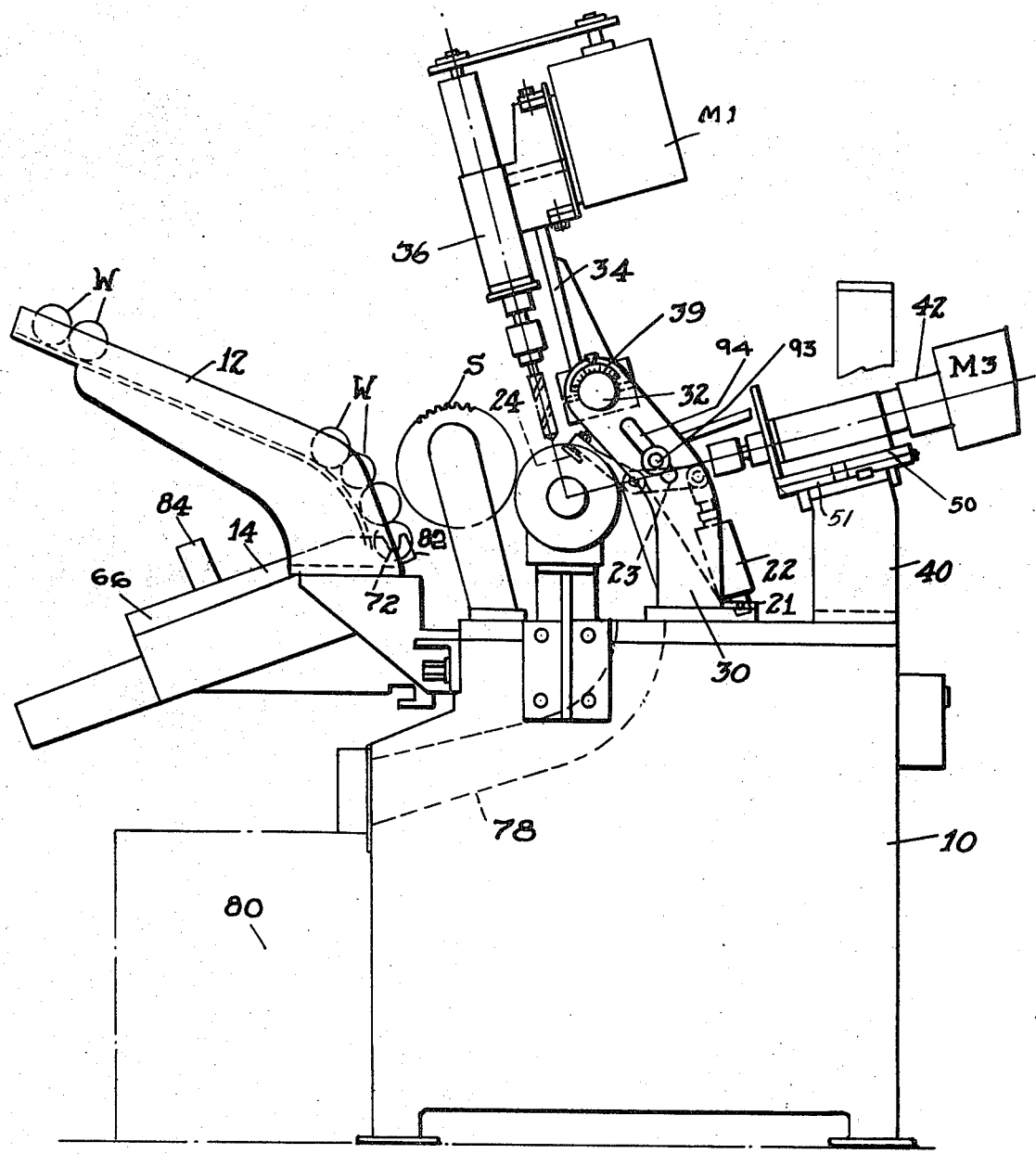
FIG. 3 is a view in end elevation looking from the opposite side of the machine from the view shown in FIG. 1.

Pneumatic cylinders 22 pivoted at 21 operate in timed relation to actuate work clamping members 24 with respect to the work W, through levers 23, prior to any operations on the workpiece except for possible cut off by the saw S. There is one saw located at each side of the machine as seen in FIG. 2. The saws are longitudinally adjustable relative to the workpieces on the driving shafts 26. In some cases these saws will not be used to trim off the ends as that would be unnecessary. The saws are driven by any convenient motor such as that shown at M in FIG. 2.

A pair of arcuate standards 30, 30 are adjustably mounted on the machine bed to be moved backwards and forwards and they support between them a rod 32 on which are slidably mounted a pair of carriages 34, 34 each one supporting a drill head as clearly shown in FIGS. 1 and 2. There may be more than two carriages and drill heads, the heads being generally commercial in design, and supplied with driving means such as at motors M1 and M2 as well as pneumatic cylinders 36, 36 for reciprocating the drills 38. These drill heads are provided with means to cause them to operate in any desired cycle and depth of cut.

It is pointed out that the heads 34, 34 are independent of each other to be adjusted along rod 32 but are keyed together to tilt about the axis of the rod 32 to a desired adjustable location with respect to the workpiece, see scale 39, and therefore remain in the same plane about the axis of rod 32.

Arranged at the rear portion of the framework 10 is a standard on which is mounted another drill head 42 but this one is of different construction inasmuch as its motor M3 is mounted axially with relation to the drill bit itself and it also is provided with a pneumatic cylinder to reciprocate it to and from the workpiece. Also, this drill head in respect to the spindle axis is adjustable laterally on plate 50 as well as longitudinally along the main support plate supported by brackets 40. Plate 50 swivels on companion plate 51, FIG. 1, so that drill head 42 is angularly adjustable also.

Figure 5:
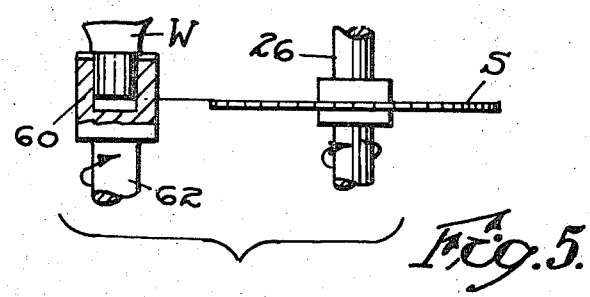
FIG. 5 is a detail view showing the relationship between the cutoff bar and the chucking device.

At either side of the machine there are chucking devices not shown in detail, these chucking devices being largely conventional in design, but also being under control of motors such as M4 and M5 and also having air cylinders moving in and out. These are coaxially aligned with the workpiece W, see FIG. 2, that is with the axis thereof. The relationship of these chucking devices with relation to the cutoff saws S is illustrated in FIG. 5 wherein a chucking device is indicated at 60 and the drive shaft for it at 62. These chucking devices rotate to chuck the ends of the spindles or workpieces W as is clearly shown in FIG. 5 but these are not always required inasmuch as the ends of the spindles or workpieces W may already have been finished prior to entrance thereof into the present machine. These devices also operate both reciprocally and rotarily according to a predetermined cycle. The chucking units also have manual longitudinal adjustment in respect to the spindle axis.

The work feeder 14 is self-contained and comprises a pair of separate upright rails or the like indicated at 66. Each rail is pivoted at its rear end portion as at 68, see FIG. 1, with relation to an inclined support 70. The forward free ends of these rails are provided with notches 72 for the reception of the ends of the spindles or workpieces W. As shown in FIG. 1, the work feeder is retracted. As it moves forward upwardly and to the left in FIG. 1, it will engage the workpiece on the workpiece holders 18 dislodging the same to the rear and down a chute or slot in the area at 74 whence it will go into a discharge track or the like 78 to a box 80.

It is the forward end portion of nose 82 of the two rails 66 which engage the workpiece and move it to the rear as clearly shown in FIG. 1, but the forward motion of these members is stopped when the succeeding workpiece W is located above the V-shaped workholders at 18, whereupon air cylinders at 84 are cyclically operated to move the rails 66 downwardly about their pivots 68 so as to come down below the workpiece, leaving it supported on the V-shaped members 18. Then the feeder including the two rails 66 moves backwards to the position shown in FIG. 1. At this point they are again in raised position so that the top edge portions of the rails 66 engage the succeeding workpiece in the hopper 12 preventing the spindles from falling out. As explained above, the work clamp 24 automatically comes down in an arc and clamps the work in position on the workholders 18 ready for the drilling operation which immediately proceeds.

Figure 6:
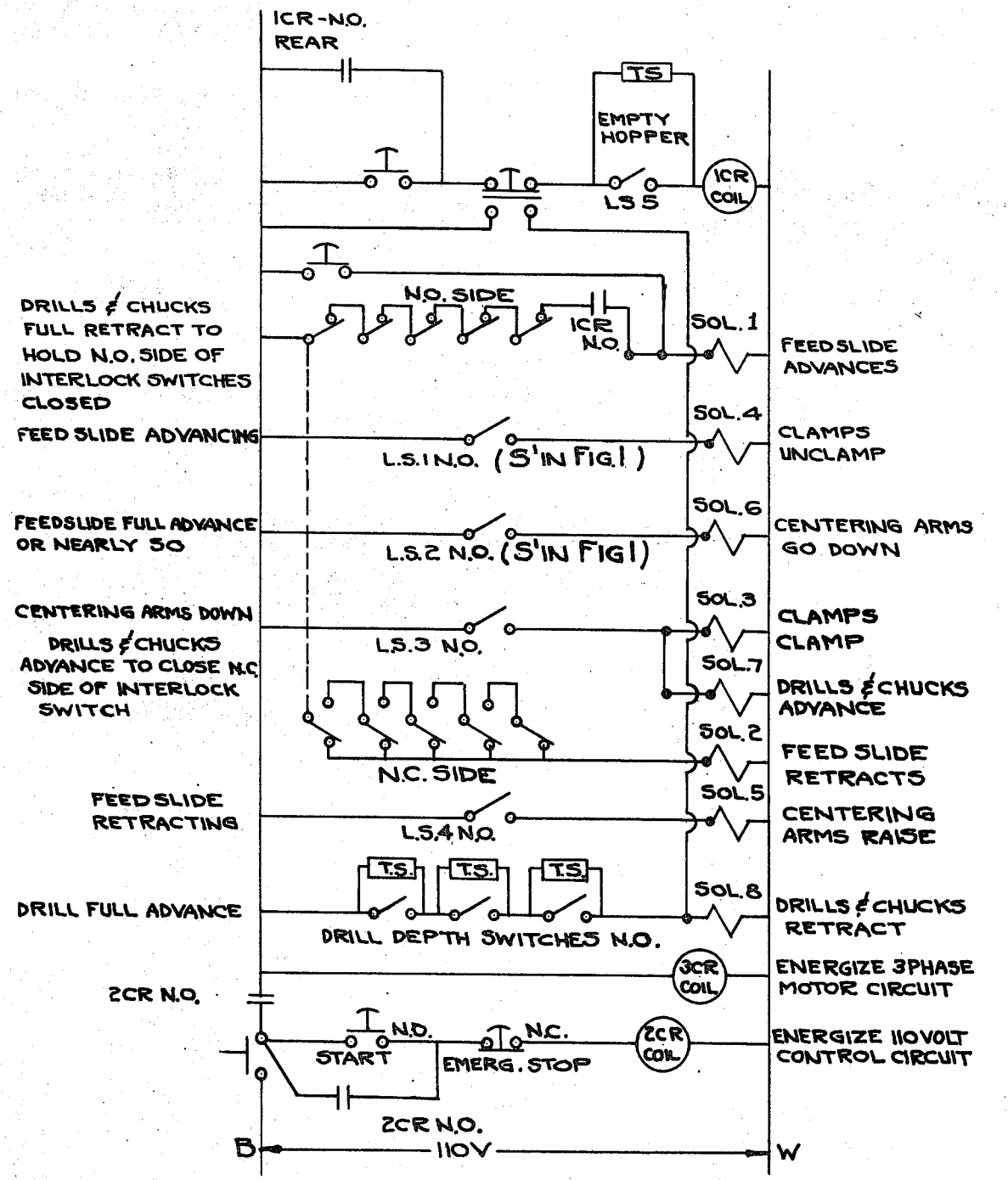
FIG. 6 is a diagram of the electric connections, showing the sequence of operations.

In the operation of the device which is under the control of manual switches indicated at 90 in FIG. 2, the operation is for the work feeder 14 to proceed forwardly. This is the first step in the cycle. As it does so, it engages and depresses certain control members (limit switches) S1 which are shown in FIG. 6 associated with the feed slide advance. The drills are in fully retracted position.

As the feed slide advance continues, the work clamps 24 unclamp, rising to the position shown in FIG. 1, and when the feeder is fully advanced or nearly so, it operates another switch, solenoid 6, so that the feeder rails descend at their forward portions and leave the work on the supports 18. The work clamps 24 then clamp, the drills and chucks advance, and the feed slide retracts. As the feed slide retracts and the feeder rails are clear of the spindle just deposited on supports 18, the feeder rails rise and the feed slide continues back to its start position. The drills and chucks have now advanced to their full advance position and come under control of certain drill depth switches as at solenoid 8 for retracting.

It will be appreciated that the drill on the drill head 42 can be adjusted into very close association with either one of the two drills on the drill heads 34. They can be moved to relatively inclined positions with respect thereto, and can be adjusted such that the drill bits just miss each other while boring in at different angular planes. An example of this might be the closeness of the bores required on spindles for three-legged stools.

Figure 4:
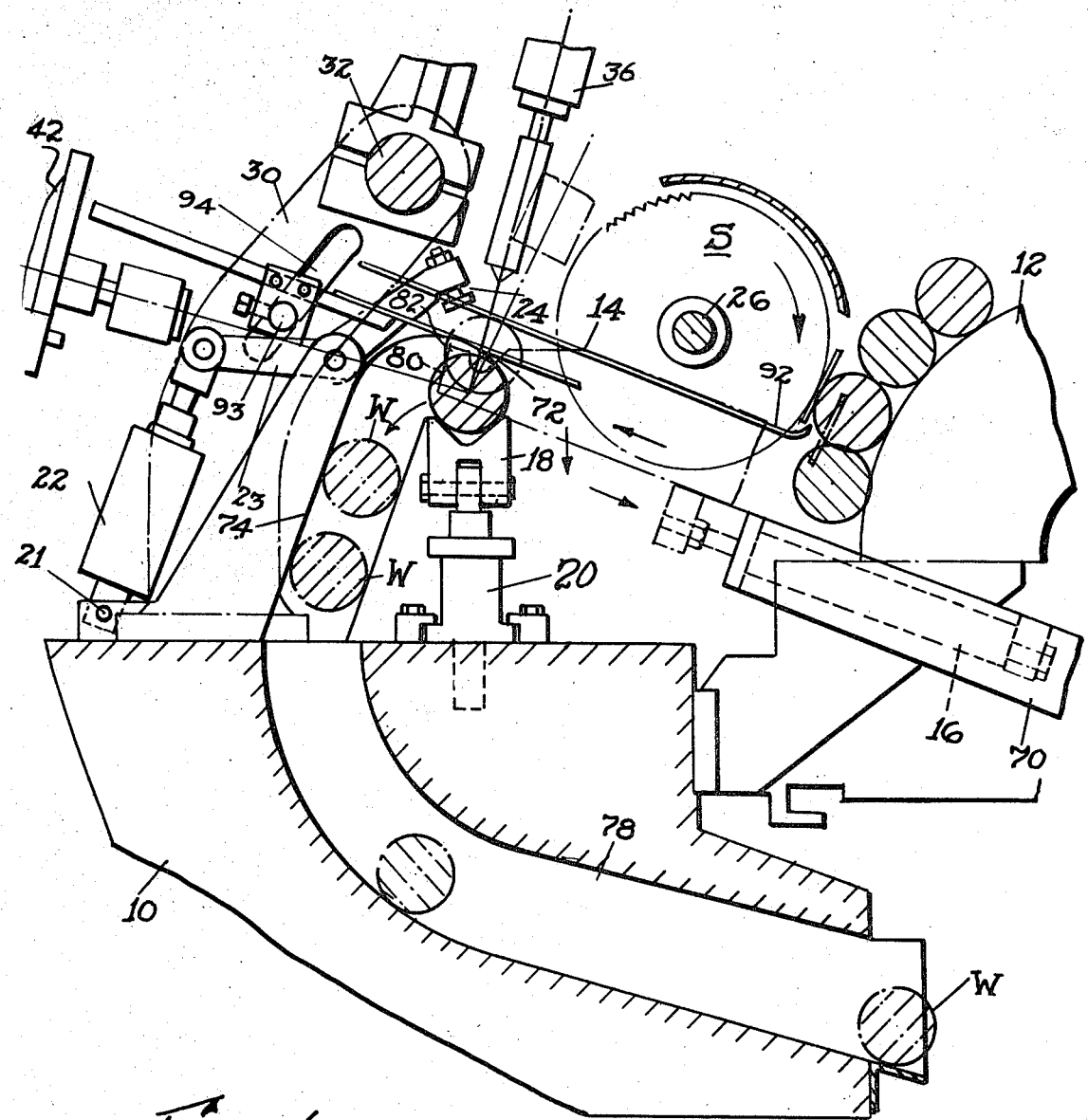
FIG. 4 is a section on line 4—4 of FIG. 2 on an enlarged scale illustrating the action of the machine from the same aspect as FIG. 1.

A pair of resilient holddown arms 92 are adjustably mounted on pins 93 as shown in FIG. 4 on the standards 30 in arcuate slots 94. These holddowns perform a double function; not only do they trap the spindle in the notches 72 passing by the cutoff saws S but they also restrain the spindle from free movement longitudinally in respect to the spindle axis while the spindle is in motion from the hopper 12 to the workholders 18. These holddowns are completely adjustable vertically, longitudinally and laterally in respect to the spindle axis and also have an angular adjustment to conform to the surface of the spindle. They restrain and guide the spindle when the rails 66 are in the "up" position.

This invention provides a very compact machine including single or double trim (cutoff saws) as a part of the normal automatic cycle. The machine even though very compact and smooth and accurate in operation, allows the means for automatic feed, single or double trim, single or double chuck, single, double, or triple bore, and automatic feed and ejection of the work back to the machine front, and it is to be noted that the drills include means or supports for longitudinal, lateral, vertical, and angular adjustments.

I claim:

1. Automatic drilling machine for drilling a plurality of generally related bores in a spindle, comprising a gravity hopper holding and releasing the spindles one by one, a reciprocating feeder including means receiving the lowermost spindle in the hopper when retracted and moving the same forwardly to the working area, means at the working area receiving and clamping the spindle;

a plurality of automatically actuated upper drill heads and a rear drill head, each drill head, including a motor for rotating the drill and means for reciprocating the drill to and from the work area for cutting bores in the spindle, means for supporting each upper drill head, said supporting means being adjustable in a direction longitudinally of the spindle when it is at the work area, means to adjust said drill heads vertically, means to adjust said drill heads at an angle with respect to the axis of the spindle in a plane parallel to the axis of the spindle;

another support for the rear drill head, this latter support being angularly adjustable and having a center at the axis of the spindle in the work area, said latter support including means for longitudinal and lateral adjustment in respect to the axis of the spindle in the work area;

and control means cycling the operation of the drills both as to rotation and reciprocation thereof, said means being controlled by the position of the spindle feeder.

2. The machine of claim 1 including means reciprocating said feeder so that the reciprocation of the feeder controls the operation of the drills.

3. The machine recited in claim 1 including chucking devices in line with the means for holding the spindle in the working area, and means for reciprocating said chucking devices toward and away from each other to operate on the spindle.

4. The machine recited in claim 1 including chucking devices in line with the means for holding the spindle in the working area, and means for reciprocating said chucking devices toward and away from each other to operate on the spindle, means for rotating said chucking devices, the rotation and the rectilinear motion of said chucking devices including control means therefor actuated by said spindle feeder.

5. The machine of claim 1 wherein said spindle feeder comprises a pair of separate spaced vertical plates, said plates being free-ended, means for moving vertically the free ends of said plates, the rear ends thereof being pivotally mounted.

6. The machine of claim 1 wherein said spindle feeder comprises a pair of separate spaced vertical plates, said plates being free-ended, means for moving vertically the free ends of said plates, the rear ends thereof being pivotally mounted, and means controlling the operation of said last-named means so that said plates are in their uppermost position as they move forwardly under the hopper and receive the lowermost spindle therein continuing in this condition until the work area is reached and then dropping to position the spindle at the work clamp, and then retreating to repeat the cycle.

7. The machine of claim 1 including means controlled by the position of said spindle feeder for operating the spindle clamping means.

8. The machine of claim 1 wherein the spindle feeder comprises a pair of vertical spaced plates, said plates being at least partially vertically movable during the reciprocation thereof, and means at corresponding ends of the plates to receive and hold a spindle from the hopper while in an uppermost position, the top edges of the vertical plates maintaining the remainder of the spindles in the hopper.

9. The machine of claim 1 wherein the spindle feeder comprises a pair of vertical spaced plates, said plates being at least partially vertically movable during the reciprocation thereof, and means at corresponding ends of the plates to receive and hold a spindle from the hopper while in an uppermost position, the top edges of the vertical plates maintaining the remainder of the spindles in the hopper, and pneumatic means to raise and lower the plates cyclically accepting any spindle within the machine specifications at the point of contact with the spindle.

10. The machine of claim 1 including means for adjusting the upper drill heads as a unit relative to the rear drill head, and means to adjust the upper drill heads laterally with respect to the axis of the spindle to bring the axes of the drill bits through the center of the spindle axis.